Sept. 9, 1969            L. V. MYERS            3,465,406
PROCESS OF FORMING SHEET METAL PANELS
Filed May 5, 1964
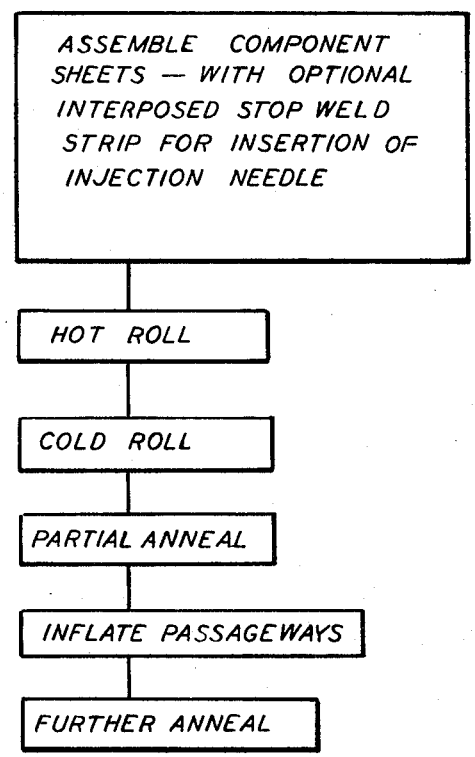
INVENTOR:
LYELL V. MYERS
BY *Robert H. Bachman*
ATTORNEY United States Patent Office 3,465,406
Patented Sept. 9, 1969

3,465,406
PROCESS OF FORMING SHEET METAL PANELS
Lyell V. Myers, Hazelwood, Mo., assignor to Olin Mathieson Chemical Corporation, a corporation of Virginia
Filed May 5, 1964, Ser. No. 365,144
Int. Cl. B21d *53/00;* B21k *29/00*
U.S. Cl. 29—157.3                        9 Claims

ABSTRACT OF THE DISCLOSURE

A method of forming a sheet metal panel having a pattern of internal hollow passageways defined by raised portions expanded out of at least one pair of integrally unified sheets, comprising the steps of providing a composite of at least two adjacently positioned metal sheets, unifying said sheets together to form an integral blank, heat treating said blank to soften said sheets, expanding at least one of said sheets between a pair of dies, at least one of which has a pattern of cavities formed therein which corresponds to said pattern of internal hollow passageways, thereby forming an expanded internal passageway panel, and further heat treating said panel to substantially increase the bond strength between said sheets at the interface thereof.

---

This invention relates generally to sheet metal processing for forming unitary composite articles having interior hollow passageways disposed between integrated sheets of metal. More particularly, the invention relates to the fabrication of such articles in which no weld preventing material is interposed between the sheets to be integrated and the bond strength of the unified sheets is controlled through heat treatment subsequent to unification.

In conventional fabrication of sheet metal panels having internal hollow cavities, a sheet of metal is imprinted by suitable means with a pattern of weld preventing material which corresponds generally to the configuration of the passageway pattern desired. Another dimensionally equivalent sheet of the same or a compatible metal is superposed on the first sheet with the pattern of weld preventing material sandwiched therebetween; the two sheets are then secured together such as by tack welding to prevent lateral shifting therebetween during subsequent processing. The composite thus formed is then heated to a suitable temperature and passed through a roll forging apparatus which pressure welds the two sheets together in the areas not covered with the weld preventing material. The sheets are thus integrally united into a single sheet except in the areas coated with the weld preventing material, where only a very weak bond, if any, is created. During the rolling operation, the individual sheets are reduced in thickness and elongated in the longitudinal direction of rolling; accordingly, the pattern of weld preventing material is initially applied in a foreshortened pattern corresponding to the final elongated pattern in direct proportion to the amount by which the sheets are elongated during rolling.

Following the roll forging operation, the unified composite is cold rolled to a final gage and may be annealed to achieve desired physical properties. The composite is then subjected to an inflation operation by providing a suitable opening between the two sheets in an area where the stop weld pattern is extended from an internal portion of the original pattern to an edge of the composite. A suitable injection nozzle is inserted into a small opening which is made by prying the sheets apart at the aforementioned edge of the composite and a fluid under pressure is injected into the unjoined portions of the composite as determined by the pattern of weld preventing material. Injection of the pressure fluid continues until all unjoined portions of the composite have been expanded to the desired height. In accordance with conventional practice, the composite may be freely inflated, i.e., without any external restraint, or it may be first inserted between a pair of shaped dies or platens having cavities formed in the faces thereof which correspond to the final desired configuration of interior hollow passageway pattern.

A major disadvantage of the prior art is the inability to achieve an expanded panel having between portions of the thickness thereof a system of internal hollow passageways or cavities which conform to a desired configuration with extreme exactness or which achieve desired close tolerances. Among the reasons for this failure of the prior art is firstly the fact that considerable difficulty is sometimes experienced in accurately imprinting a foreshortened pattern of weld preventing material which will achieve the desired final configuration after elongation during pressure rolling, due to the many variables which must be considered when contemplating the pattern. Secondly, it is not always possible to accurately predict the extent to which the individual sheets will bond or not bond in those areas immediately adjacent the periphery of the weld preventing material pattern, and this frequently leads to minor variations in the ultimate cavity pattern. Still further is the fact that minor variations in the thickness or the physical properies of the individual sheets may result in corresponding variations in the tube or passageway height in the final product as a result of differential expansion when the unified panel is subjected to the inflation pressure, particularly if the panel is expanded freely. On the other hand, if shaped dies are employed to confine the expanded tubes to the desired configuration, a major difficulty is encountered in correlating the imprinting of the initial stop weld pattern and the contemplated elongation thereof with the preformed dies in order to achieve a correspondence between the elongated weld preventing material pattern and the die pattern so that the panel will expand in the unjoined areas thereof into the corresponding cavities provided in the die faces.

A more recent proposal intended to obviate the prior art difficulties is that of covering the entire surface of the confronting faces of the sheets to be forge welded, except for a peripheral margin, with weld preventing material and subsequently inflating the unified composite between a pair of dies or platens having cavities or grooves cut therein which correspond to the desired shape of the internal hollow passageway system. The unrelieved surface portions of the platens maintain the individual sheets in intimate contact and therefore retain the weak bond effected during the rolling operation. It is apparent that a panel fabricated by this procedure is not suitable for high pressure applications in view of the relatively weak bond between the composite sheets in those areas not expanded during the inflation process.

These and other disadvantages of the prior art practice have been overcome to a surprising extent by the present invention which contemplates a method of fabricating an expanded passageway or hollow cavity panel in which the hollow portions of the panel are held to extremely close tolerances and a very strong bond is effected between the confronting faces of the composite sheets in the areas between the expanded portions. Thus the article formed by the process of this invention finds utility in all of the prior art applications for forge welded panels having interior hollow passageways, such as for heat exchange components where an exact predetermined volume for containment of a heat transfer medium is necessary, whether of high or low pressure, for heating applications where an electric heating wire or element is inserted in the hollow passageway, and in the architectural fields where it is aesthetically desirable to have a pattern of raised or embossed surface configurations which conform precisely to a predetermined design. It is noteworthy that with the extreme bond achieved by the process of this invention, an architectural panel such as that described has the characteristic of structural rigidity in addition to design preciseness. A major advantage of the present invention over prior art practice is the elimination of the necessity of using any weld preventing material in forming the composite to be forge welded, thus eliminating the problems inherent in the use of this material, such as accurate screening or other stop weld material application, precise determination of the foreshortened pattern to achieve the desired passageway pattern after rolling, accurate correlation between stop weld pattern, rolling elongation, and cavity pattern in dies or platens, and irregular border of passageway configuration and non-uniform tube height when using free inflation.

The present invention contemplates, in one of its broader aspects, the provision of a blank or composite composed of a plurality of superposed metal sheets which are assembled together in face to face relationship and forge welded together under controlled conditions of temperature and pressure, after which the unified composite is annealed to a minimum degree sufficient to soften the metal to facilitate inflation without materially increasing the bond strength between the sheets. The composite is then placed between suitable dies or platens having cavities or grooves formed therein which correspond to the desired passageway pattern. The composite is inflated by injecting a suitable fluid under pressure between the sheets to expand them into the cavities formed in the dies, thereby causing the sheets to expand into the cavities and conform to the configuration thereof. Thereafter, the composite, with interior hollow passageways, is again annealed at a suitable temperature to increase the bond strength between the sheets.

Having thus described in general terms on embodiment of the present invention, it is a principal object thereof to provide a method of fabricating a sheet metal panel having internal hollow portions or cavities of a particular design.

It is another object of the present invention to provide a method of fabricating a sheet metal article having internal hollow portions or cavities in which the ultimate configuration thereof corresponds with extreme accuracy to the desired configuration thereof.

It is another object of the present invention to provide a method of fabricating a sheet metal panel having internal hollow portions or cavities of a particular design which are achieved without the use of any stop weld material, thus eliminating prior art problems attendant with the use of such material.

It is still another object of the present invention to provide a method of fabricating a sheet metal article having internal hollow passageways or cavities in which the cavity pattern is determined solely by a cavity configuration formed in one or both opposing faces of a pair of constraining dies and which will accurately conform to the pattern thereof.

It is yet another object of the present invention to provide a method of fabricating a sheet metal article having internal hollow passageways or cavities of a particular configuration and having a high degree of intimacy of bond between the composite sheets in the areas intermediate the interior hollow passageways.

It is yet another object of the present invention to provide a method of fabricating a sheet metal article having interior hollow passageways or cavities of a particular configuration and having a high degree of intimacy of bond between the composite sheets in the areas intermediate the interior hollow passageways, in which the outer walls of the passageways are substantially or completely free of oppositional forming marks.

It is a further object of the present invention to provide a method of fabricating a sheet metal article of the character described which is efficient, economical and has a high production rate.

These and other objects of the present invention will become more readily apparent from a consideration of the following detailed description of the invention.

The practice of the present invention is applicable to a broad category of aluminum alloys which are susceptible to being roll forged and which can be expanded by fluid pressure injection, such as 1100, 3003, the 2000 series, the 5000 series and the 6000 series, as well as any alloy which can be clad with 1100 alloy. Among these, aluminum alloys 1100, 3004 clad with 1100, and 3004 have been found to be particularly well suited to the practice of this invention.

In general, conventional casting and pretreatment processing are followed in the preparation of the raw material or composite sheet stock. Also, in the preparation of the composition sheet stock for the forge welding operation, standard practice is followed with regard to the desirable procedures of cleaning and/or wire brushing the metal surfaces.

As a general matter, the application of stop weld material is completely eliminated, at least in the general area of the ultimate pattern of internal passageways in the finished panel. It may be found desirable, however, to employ a small area or strip of weld preventing material at the point where an initial separation is made between the unified sheets to permit entry of an injection needle through which the expansion fluid is injected. However, this small application of stop weld material is not essential where other suitable provision is made for injecting the expansion fluid.

A pair of dimensionally equivalent sheets of the composite stock are assembled together in face to face relationship, either with or without the small strip of stop weld material just mentioned, and the sheets are temporarily secured together by conventional means. The composite thus formed is heated to a temperature within the range of 850° to 960° F., preferably at about 900° F., and then pressure rolled at this temperature to a reduction in thickness of about 14% to 75%, depending upon the alloy. It has been found that alloys 1100, 3003 and any other alloy clad with 1100 should be hot rolled to a reduction within the range of about 14%–30%, preferably at about 25%, to achieve optimum bonding for subsequent fluid pressure expansion. However, it has also been found that alloys 3004 and those in the 5000 series should be hot rolled to a reduction within the range of about 50% to 75%, preferably at about 65%, to achieve desired bonding.

The hot rolling welds the composite sheets together with a certain degree of bond strength more fully described below. After hot rolling, the unified composite may be cold rolled to a desired thickness, usually in the range of approximately 20% to 60% reduction to achieve accurate control of gage. It is not thought to be necessary to cold roll in all situations to achieve the desired degree of bond strength for subsequent expansion, and cold rolling frequently achieves only an economic advantage. It will be readily observed that the above listed thickness reductions are quite different from the more conventional pressure welding reduction thickness for hot and cold rolling which are usually found to be in the order of 65 percent and 35 percent respectively. The reason for this difference in rolling reduction thicknesses is that it is desirable in the practice of this invention to effect a relatively weak bond between the composite sheets so that subsequent inflation or expansion of certain segments of these sheets can be achieved without the necessity of employing excessively high inflation fluid pressures. An increased bond strength between the composite sheets is developed subsequent to the inflation step as more fully described hereafter.

Another significant advantage which is achieved by maintaining an initially low bond strength is the substantial ease in complete elimination of oppositional forming marks. These are marks left on a tube at a point where inflation which is proceeding toward that point from opposite directions meet. These marks are the result of lateral depressions formed in the outer tube wall and extending thereacross, and not only impair the appearance of the finished article, particularly where its intended application makes aesthetic considerations important, but also constitutes a constriction in the flow passageway which may have an adverse effect upon the flow characteristics of the device if the device is intended for use in application where flow characteristics are important.

Thus it can easily be seen that any parallel inflation path design having a plurality of interconnecting tubes will have oppositional forming marks in these tubes. These marks become more severe as the inflation pressure required to complete the inflation of a part increases. Oppositional forming marks become quite severe and objectionable as the inflation pressure required to expand the tubes approaches the inflation pressure limit for a particular design and metal yield strength combination.

In regard to the inflation pressure limit, it should be noted that the pressure limit is defined as the pressure at which the metal wall will break out before inflation proceeds. The pressure limit or high pressure limit during inflation is a function of the alloy, yield strength, and the design under consideration. A high tube height and low yield strength metal will give low inflation pressure limit, while a low tube height and high yield strength metal will give a higher inflation pressure limit.

Subsequent to the above described rolling operation, the now unified composite is subjected to a heat treatment or annealing operation in order to reduce the work hardening effects of the cold rolling. This is so for the reason that with the metal in a hard condition, it will shear out before a reasonable tube height can be reached. This anneal, which is usually carried out at a temperature within the range of 675 to 700° F., optimally is about 700° F., for a period of time of approximately 1 to 3 minutes, optimally at about 1 minute, is held to the minimum necessary in order to obtain the necessary relief from work hardening which permits expansion to the desired tube height.

A major factor to be considered as a reason for keeping the annealing operation to the minimum required to facilitate expansion is that of bond strength growth. More particularly, the growth of bond strength is a phenomenon of heating and/or annealing of the processed metal. Thus, it has been found that aluminum alloys such as those hereinbefore mentioned exhibit this property of bond strengthening during annealing and it has been found to occur over the range of hot rolling reduction mentioned hereinabove. It will be readily recognized that this phenomenon of bond strength growth is very important in regard to controlling oppositional forming marks and the inflation pressure limit for a particular design. Thus, holding the bond strength low for inflation purposes will decrease the oppositional forming marks and keep the inflation pressure well below the inflation pressure limits defined above, while further annealing will increase the residual bond strength to a functional level. Thus, it will now be understood that when the first anneal is held to a minimum, the inflation pressure required will be less and fewer problems will be encountered with oppositional forming marks and the inflation pressure limit.

Subsequent to the first annealing operation, the unified composite is placed between a pair of hold down dies or platens which have suitable grooves or cavities formed by any conventional means in the opposing faces thereof. The grooves or cavities are preformed in configuration to correspond with the pattern of tubes, passageways or other expanded shapes desired in the finished article. The dies are brought together into contact with the outer surfaces of the unified composite and sufficient pressure is applied thereto to resist separation as the result of inflation fluid pressure subsequently applied.

After making suitable connection between the interior of the composite and a source of inflation fluid, the fluid is injected between the sheets of the composite in the areas where the die faces are relieved by the aforementioned grooves or cavities. It has been found that pressures in the order of 2000 p.s.i. to 3000 p.s.i. will suffice to effect the desired expansion of the sheets providing the proper conditions of hot rolling temperature and reduction are maintained, and the limitations of the partial anneal are met. The composite sheets thereby expand into these grooves or cavities, while the unrelieved die portions restrain expansion of the composite sheets elsewhere. Under the action of the inflation fluid, the expanding sheet portions form the walls of the interior passageways which are defined between the unexpanded areas of the still unified composite sheets.

It will be apparent that, in view of the relatively high inflation fluid pressures which are necessary to expand the composite sheets in the absence of stop weld material, the expanded sheet portions will conform with great accuracy to the configuration of the hollow cavity pattern formed in the restraining dies.

Subsequent to expansion, the now fully formed panel having the desired pattern of interior hollow passageways imparted thereto, is removed from the confining dies or platens and the inflation fluid is removed from the passageways in the conventional manner. The panel is then subjected to a second annealing process during which it is heated to a temperature within the range of 750° to 1000° F., preferably at about 1000° F., and held at this temperature for a period of time in the order of 10 to 60 minutes, preferably for about 60 minutes. This second annealing increases the bond strength of the panel in the still unified areas between the expanded passageway portions as described hereinbefore. It will be observed that the second or bond growth anneal is considerably longer in time than the first anneal preceding inflation. This is so for the reason that bond growth requires a slow soaking anneal with as much time at temperature as possible.

It will be apparent from the foregoing description that there has been provided a method for making an expanded sheet metal article which is believed to provide a solution to the foregoing problems and achieve the aforementioned objects. It is to be understood that the invention is not limited to the specific procedures described herein which are deemed to be merely illustrative of the best manner of carrying out the invention, but rather is intended to encompass all such modifications as are within the spirit and scope of the invention as set forth in the appended claims.

What I claim and desire to secure by Letters Patent is:

1. A method of forming a sheet metal panel having a pattern of internal hollow passageways defined by raised portions expanded out of at least one of a pair of integrally unified sheets, comprising the steps of (A) providing a composite of at least two adjacently positioned metal sheets, said sheets being disposed in metal to metal contact at the interface thereof, (B) hot rolling said composite in the presence of sufficient temperature and pressure to integrally unify said sheets together at said interface, thereby forming a unified blank, followed by cold rolling the resultant blank, (C) partially annealing said blank to remove the work hardening effects of said cold rolling, thereby softening said sheets, (D) expanding at least one of said sheets between a pair of hold down dies, at least one of which has a pattern of cavities formed therein which corrseponds to said pattern of internal hollow passageways, by injecting between said sheets a fluid under pressure, thereby forming an expanded internal passageway panel, and (E) further annealing said panel to substantially increase the bond strength between said sheets at said interface.

2. A method of forming a sheet metal panel having a pattern of internal hollow passageways defined by raised portions expanded out of at least one of a pair of integrally unified sheets, comprising the steps of (A) providing a composite of at least two adjacently positioned metal sheets, said sheets being disposed in metal to metal contact at the interface thereof, (B) hot rolling said composite in the presence of sufficient temperature and pressure to integrally unify said sheets together at said interface with a relatively weak bond, thereby forming a unified blank, followed by cold rolling the resultant blank, (C) partially annealing said blank in a temperature range and for a period of time sufficient to remove the work hardening effects of said cold rolling, but insufficient to materally effect the bond strength of said sheets at said interface, (D) expanding at least one of said sheets between a pair of hold down dies, at least one of which has a pattern of cavities formed therein which corresponds to said pattern of internal hollow passageways, by injecting between said sheets a fluid under pressure, thereby forming an expanded internal passageway panel, and (E) further annealing said panel in a temperature range and for a period of time sufficient to substantially increase the bond strength between said sheets at said interface.

3. A method of forming a sheet metal panel having a pattern of internal hollow passageways defined by raised portions expanded out of at least one of a pair of integrally unified sheets, comprising the steps of (A) providing a composite of at least two adjacently positioned metal sheets, said sheets being disposed in metal to metal contact at the interface thereof, (B) hot rolling said composite in the presence of sufficient temperature and pressure to integrally unify said sheets together at said interface with a relatively weak bond, thereby forming a unified blank, followed by cold rolling the resultant blank, (C) partially annealing said blank at a temperature within the range of 675° to 700° F., for 1 to 3 minutes to remove the work hardening effects of said cold rolling, (D) expanding at least one of said sheets between a pair of hold down dies, at least one of which has a pattern of cavities formed therein which corresponds to said pattern of internal hollow passageways, by injecting between said sheets a fluid under pressure, thereby forming an expanded internal passageway panel, and (E) further annealing said panel at a temperature within the range of 750° to 1000° F., for 10 to 60 minutes to substantially increase the bond strength between said sheets at said interface.

4. A method of forming a sheet metal panel having a pattern of internal hollow passageways defined by raised portions expanded out of at least one of a pair of integrally unified sheets comprising the steps of (A) providing a composite of at least two adjacently positioned metal sheets, said sheets being disposed in metal to metal contact at the interface thereof, (B) hot rolling said composite at a temperature within the range of 850° to 960° F., to a reduction in thickness of 14% to 75% to integrally unify said sheets together at said interface with a relatively weak bond, thereby forming a unified blank, followed by cold rolling the resultant blank to a reduction in thickness of twenty to sixty percent to effect a desired gage, (C) partially annealing said blank at a temperature within the range of 675° to 700° F., for 1 to 3 minutes to remove the work hardening effects of said cold rolling, (D) expanding at least one of said sheets between a pair of hold down dies, at least one of which has a pattern of cavities formed therein which corresponds to said pattern of internal hollow passageways, by injecting between said sheets a fluid under pressure, thereby forming an expanded internal passageway panel, and (E) further annealing said panel at a temperature within the range of 750° to 100° F., for 10 to 60 minutes to substantially increase the bond strength between said sheets at said interface.

5. The method as set forth in claim 4 wherein said metal sheets are fabricated from an aluminum alloy selected from the group consisting of aluminum alloy of 1100 and an aluminum alloy clad with aluminum alloy 1100, and wherein said hot rolling reduction is within the range of 14% to 30%.

6. The method as set forth in claim 4 wherein said metal sheets are fabricated from an aluminum alloy selected from the group consisting of aluminum alloy 3004 and the 5000 series of aluminum alloys, and wherein said hot rolling reduction is within the range of 50% to 75%.

7. The method as set forth in claim 4 wherein said partial annealing is carried out at a temperature of 700° F., for 1 minute.

8. The method as set forth in claim 4 wherein said further annealing is carried out at a temperature of 1000° F., for 60 minutes.

9. A method of forming a sheet metal panel having a pattern of internal hollow passageways defined by raised portions expanded out of a pair of integrally unified sheets, comprising the steps of (A) providing a composite of a pair of adjacently positioned metal sheets, said sheets being disposed in metal to metal contact at the interface thereof, (B) hot rolling said composite at a temperature within the range of 850° to 960° F., to a reduction in thickness of 14% to 30% to integrally unify said sheets together at said interface with a relatively weak bond, thereby forming a unified blank, (C) cold rolling said blank to a reduction in thickness of 20% to 60% to effect a desired gage, (D) partially annealing said blank at a temperature within the range of 675° to 700° F., for 1 to 3 minutes to remove the work hardening effects of said cold rolling, (E) expanding said sheets between a pair of hold down dies, said dies having a pattern of cavities formed therein which corresponds to said pattern of internal hollow passageways, by injecting between said sheets a fluid under pressure, thereby forming an expanded internal passageway panel, and (F) further annealing said panel at a temperature within the range of 750° to 1000° F., for 10 to 60 minutes to substantially increase the bond strength between said sheets at said interface.

References Cited
UNITED STATES PATENTS 3,289,281   12/1966   Agin et al. _____ 29—157.3

PAUL M. COHEN, Primary Examiner

U.S. Cl. X.R.

113—118

UNITED STATES PATENT OFFICE

CERTIFICATE OF CORRECTION

Patent No. 3,465,406          Dated September 9, 1969

Inventor(s) Lyell V. Myers

It is certified that error appears in the above-identified patent and that said Letters Patent are hereby corrected as shown below:

In Column 3, line 38, the word "on" should read --one--.

In Column 4, line 20, the word "composition" should read --composite--.

In Column 8, line 16, change "100°F" to read --1000°F--;

In Column 8, line 21, after the words "aluminum alloy" the word "of" should be deleted.

SIGNED AND
SEALED
NOV 17 1970

(SEAL)
Attest:

Edward M. Fletcher, Jr.
Attesting Officer

WILLIAM E. SCHUYLER, JR.
Commissioner of Patents